United States Patent [19]

Ironside et al.

[11] Patent Number: 5,663,713

[45] Date of Patent: Sep. 2, 1997

[54] CONTROL SYSTEM

[75] Inventors: John Michael Ironside, Birmingham; Andrew James Stephen Williams, Solihull; Brian Graham Nicholson, Redditch; Russel Wilson-Jones, Stratford-upon-Avon; Clive Roger Sainsbury, Birmingham, all of England

[73] Assignee: Lucas Industries Public Limited Company, England

[21] Appl. No.: 526,046

[22] Filed: Sep. 8, 1995

[30] Foreign Application Priority Data

Sep. 8, 1994 [GB] United Kingdom ............... 9418135

[51] Int. Cl.$^6$ ............................................. G08B 21/00
[52] U.S. Cl. ..................... 340/661; 340/635; 327/143; 327/5; 361/88
[58] Field of Search ............................. 340/661, 635; 327/143, 5, 16; 307/10.1; 361/88

[56] References Cited

U.S. PATENT DOCUMENTS 4,433,390  2/1984  Carp et al. ..................... 327/143
5,519,346  5/1996  Haddad et al. .................. 327/143
5,581,206  12/1996  Chevallier et al. .............. 327/143

FOREIGN PATENT DOCUMENTS 4212069  5/1993  Germany.

Primary Examiner—Jeffery Hofsass
Assistant Examiner—Julie B. Lieu
Attorney, Agent, or Firm—Cesari and McKenna

[57] ABSTRACT

A control system comprises a controller for controlling an actuator, for instance of an electrically power assisted vehicle steering system. An unstable circuit, such as first and second cascade connected integrators has an input connected to the controller and an output connected to a detector, which signals an error when the output signal of the unstable circuit is outside an acceptable range. During normal operation, the controller supplies a signal to the unstable circuit such that its output signal remains within the acceptable range. The error signal may be used to disable the actuator, for instance so as to remove power assistance from steering system.

18 Claims, 4 Drawing Sheets

CONTROL SYSTEM

The present invention relates to a control system.

There exists a class of control systems which, in the event that a system fault arises, can be shut-down without introducing a safety hazard, even though continued system operation would involve a hazard. This "fail-stop" type of system is generally much cheaper than a "fault-tolerant" one which is designed to continue to provide normal operation safely in the presence of one or more faults. One example is a type of automotive electrical power-assisted steering system which is isolated from a vehicle steering when it is shut-down. Another example from the field of driver comfort systems is a powered driver's seat adjustment system. Any such system may be divided into two areas, namely an unprotectable area and a protectable area. The unprotectable area consists of a set of parts (normally from zero up to a few in number) which must be reliable to provide safe service. The protectable area consists of a (usually) larger set of parts, any failure of which is automatically detected and compensated for by shut-down of the system. This invention is particularly applicable to the protection of this protectable area of the system.

The normal operating functions of many such systems are controlled by a microcontroller (MCU). This type of hardware is relatively reliable and can host software which is able to evaluate the proper functioning of most of the rest of the system (sensors, drive stage, actuators, and their power supplies) during normal operation as well as providing the normal control function. In the event that the MCU detects a failure, it can invoke protection channels. These may, for instance, isolate the actuator(s) from their power supply and/or the actuated equipment, as appropriate.

To verify that this protection is indeed available, the MCU may periodically test each of the channels of the protection sub-system. This can, in general, only be done when the normal function is not required, since performing each test will interrupt some aspect of the actuation system. It may therefore be done during some special phase of an operational mission such as at the end of a journey. Each protection channel is tested individually. A successful test demonstrates that the unavailability of that protection channel is momentarily zero. In the rare event of a failed test, the main function can be inhibited until a successful repair has been completed. The test result can be recorded in non-volatile memory using an error detecting and correcting code.

The Failure Rate $r(t)$ of an item is defined as the conditional probability density of failure by the time $t+dt$, given that it has survived to the time t. In practice $r(t)$ can often be approximated by a constant r, the reciprocal of the Mean Time to Failure, MTTF.

Each protection channel will of course be designed to be reliable, so that its failure rate will be very low. The unavailability will rise initially after a successful test from zero at a rate of r per unit time. Since the periodic tests will occur at much more frequent intervals than 1/r, the probability of protection being unavailable when actually needed will only reach an extremely low level before the next test occurs, unless a common cause were to affect both the normal function and the protection function.

One such cause would be a fault in the MCU hardware or software, since much of the logic of the protection system resides in the MCU. Systematic errors may lie undetected in the design of the software or hardware, awaiting the arrival of a sequence of input data that will cause an unwanted output. Hardware failures may also occur. Some protection against design errors may be afforded by further software elements operating within the MCU to check whether the outputs of the control software are plausible in the light of the input data. This protection cannot be assumed to be perfect because the effect of an original fault in either the control or the protection software may be to interfere with the operation of both. Thus, although the single MCU is a most effective tool for detecting and isolating system faults, it may not be relied on completely.

A known electronic control unit (ECU) comprises two independently powered MCUs. The main MCU co-operates with a second MCU to identify failures of either MCU through a set of mutual plausibility tests. However, such an arrangement is relatively complex and costly and does not, for instance, test the correct functioning of an analogue-to-digital converter (ADC) within either or both of the MCUs.

Another known control system comprises a single MCU which, in addition to providing control functions, forms part of an automatic checking arrangement. A software driven binary output port of the MCU is connected to an AC coupled charge pump. The output voltage of the charge pump is low pass filtered and supplied to the ADC of the MCU. The MCU software is required to perform a "test task". This is to provide closed loop control of the output voltage of the charge pump by adjusting the frequency at which it toggles the MCU output port. Failure to keep the controlled voltage within the limits of a window comparator causes the system to shut down.

The time available to shut the system down safely in the event of failure may be only a small multiple of the MCU software cycle time. Thus, the output of the charge pump and low pass filter, which comprise a frequency-to-voltage converter, must reach the window threshold within that time if the MCU ever stops controlling the binary output port. The thresholds of the window comparator must however be set wide enough apart to allow for component tolerances and deficiencies in the control provided by the MCU without producing false shut down events. There is therefore a tolerance band of MCU output port frequencies which will not cause the frequency-to-voltage output to reach the window threshold quickly enough to shut the system down safely. Furthermore, within this tolerance band there is a narrower band of frequencies which will never cause the system to shut down.

With such a system, shut down would not be invoked in time if the MCU were to fail in a mode which left the safety circuit output port toggling at a frequency within the wider tolerance band. MCUs have been known to fail with the outputs toggling at a fixed frequency or in some repetitive pattern. Thus, simple fault scenarios may occur without there being effective protection.

It is, in principle, difficult to envisage all of the ways in which an MCU might fail and to ensure that the "test task" will fail in each instance. MCU failures may include, among others, the following:

ADC wrong;

Address/data corruption;

Multiplexing stuck;

Repeated false interrupt;

Software stuck in a loop, possibly giving a fixed frequency output or a simple repeating pattern;

Output hardware continuing to toggle after MCU failure giving a fixed frequency output or a simple repeating pattern;

Timing of pulse trains wrong; and

Arbitrary output after MCU "blows up".

It is most desirable for a control system to shut down in the event of any such fault or faults occurring.

The term "unstable circuit" as used herein is defined to mean a circuit providing an output voltage which is substantially constant (referred to as the "equilibrium output voltage") when an input voltage is at a predetermined constant value (referred to as the "steady state input voltage") and which changes so that the three parameters:

(1) the difference between the output voltage and the equilibrium output voltage;
(2) the first time differential of (1); and
(3) the second time differential of (1)

never simultaneously asymptotically approach zero after the input voltage is momentarily changed from and returned to the steady state input voltage.

For instance, a practical circuit will have upper and lower limits on its output voltage and current. The behaviour may be offset i.e. biased away from zero voltage or a voltage substantially midway between the power supply rails. The circuit may incorporate non-linear components, such as a diode, which cause it to have different behaviour at different input and output voltages. An unstable circuit will have at least one theoretical equilibrium condition. In this condition, the presence of the steady state input voltage at the input will hold the output at the equilibrium output voltage. In practice, this condition may not actually be achievable because of electrical noise or thermal variations perturbing the circuit away from its equilibrium. Nevertheless, ignoring such imperfections of a practical circuit, an unstable circuit will have at least one theoretical equilibrium condition which represents a state of unstable equilibrium.

In practical circuits, in response to a perturbing impulse at the input, the output voltage moves away from the equilibrium output voltage and ultimately hits one of the operating limits of the circuit. The impulse may be of a very short duration and may be of a very low level but, in practice, should be large enough to overcome small unwanted currents in the circuit, such as bias currents for operational amplifier inputs. In practice, impulses of sufficiently low amplitude and/or duration may be masked by noise. However, for a practical implementation of an unstable circuit, this does not matter as it can be ensured that any practical perturbing impulses or more constant signals are of sufficient amplitude and/or duration to disturb the circuit away from its unstable equilibrium condition.

According to the present invention, there is provided a control system comprising a controller having a first output forming a system control output and a second output, an unstable circuit as hereinbefore defined having an input connected to the second output and an output connected to an input of the controller, and a detector connected to the output of the unstable circuit and arranged to signal an error when an output signal at the output of the unstable circuit is outside an acceptable range, the controller being arranged, during correct operation thereof, to supply at the second output a signal which causes the unstable circuit to produce the output signal within the acceptable range.

Preferably the detector comprises a window comparator.

The controller is preferably of digital type, such as a programmable data processor which may incorporate other hardware such as an analog-to-digital converter so as to constitute an MCU. The unstable circuit preferably comprises an analogue circuit. By embodying the controller and the unstable circuit in different electronic technologies, the possibility of a common fault or failure affecting the whole control system is reduced. Similarly, susceptibility to power supply failure may be reduced by providing separate power supplies for the controller and the unstable circuit.

A latch may be provided for providing a latched error signalling response to signalling of an error by the detector.

The unstable circuit may comprise two integrators connected in cascade. In such a circuit arrangement, an impulse applied to the first integrator results in a substantially constant change in the output thereof. This constant change is then integrated by the second integrator whose output ramps to one of its operating limits. The integrators may be arranged to have reference voltages which are asymmetric with respect to supply voltages of the integrators. The first integrator may be arranged to have different integrating time constants for different input voltage ranges.

In another embodiment, the unstable circuit may comprise an integrator provided with positive feedback. At the equilibrium point, the input voltage balances the output voltage of the integrator. When the input voltage is momentarily moved away, the resulting imbalance causes the integrator output to change. When the input voltage returns to its previous voltage, the net input voltage to the integrator will no longer balance the output voltage and the imbalance will cause the integrator to continue integrating and to ramp the output to one of its operating limits.

For the purpose of clarification, it is pointed out that a single integrator or an integrator with negative feedback is not an unstable circuit. In the case of a single integrator, an impulse applied to the input will result in a finite change in the output voltage but this will not necessarily cause the output voltage to move to one of the operating limits. In particular, the impulse can be made sufficiently small to ensure that the integrator output does not become different after a predetermined time delay from the equilibrium output voltage by at least a predetermined amount, and so does not fall within the definition of "unstable circuit" as given herein before.

In the case of an integrator with negative feedback, any imbalance between the input and output voltages causes the integrator to move the output voltage closer to the input voltage. Thus, if an impulse is applied to such an arrangement, the output will initially move away from the input but, following the return of the input to the steady state input voltage, the output will return to the equilibrium output voltage under the effect of the negative feedback.

The controller may be arranged to perform any suitable function of the output signal of the unstable circuit in order to supply at its second output a signal which causes the unstable circuit to produce the output signal within the acceptable range. For instance, the function may include proportional and differential terms. The controller may be arranged to supply a two state signal at the second output in the form of pulses whose duty cycle or density varies so as to cause the output signal of the unstable circuit to remain within the acceptable range.

The control system may further comprise means for effectively disabling control by the first output. For instance, where the first output is arranged to control an actuator, the means may be arranged to disable the actuator, for instance by disconnecting the actuator from a power supply. Alternatively or additionally, the means may be arranged to disconnect the actuator from the first output or to disconnect the actuator from a load.

It is thus possible to supply a relatively simple and inexpensive arrangement which allows part of a control arrangement to be shut down in the event of a control system failure. Such an arrangement is capable of signalling an error in the event of the occurrence of any of the failures described hereinbefore. Further, in the case of an MCU incorporating an ADC, correct operation of the ADC is also monitored.

The cost and complexity of a second MCU can be avoided. The failure or error checking can be provided by an arrangement at least partially external to the MCU whose simplicity, robustness, and non-programmability remove some possibilities for common cause failures of MCUs and testing devices where they employ similar technology. Common cause failure possibilities which may be removed include software design process faults and shared vulnerabilities, for instance to a power supply fault.

The invention will be further described, by way of example, with reference to the accompanying drawings, in which.

Figure 1:
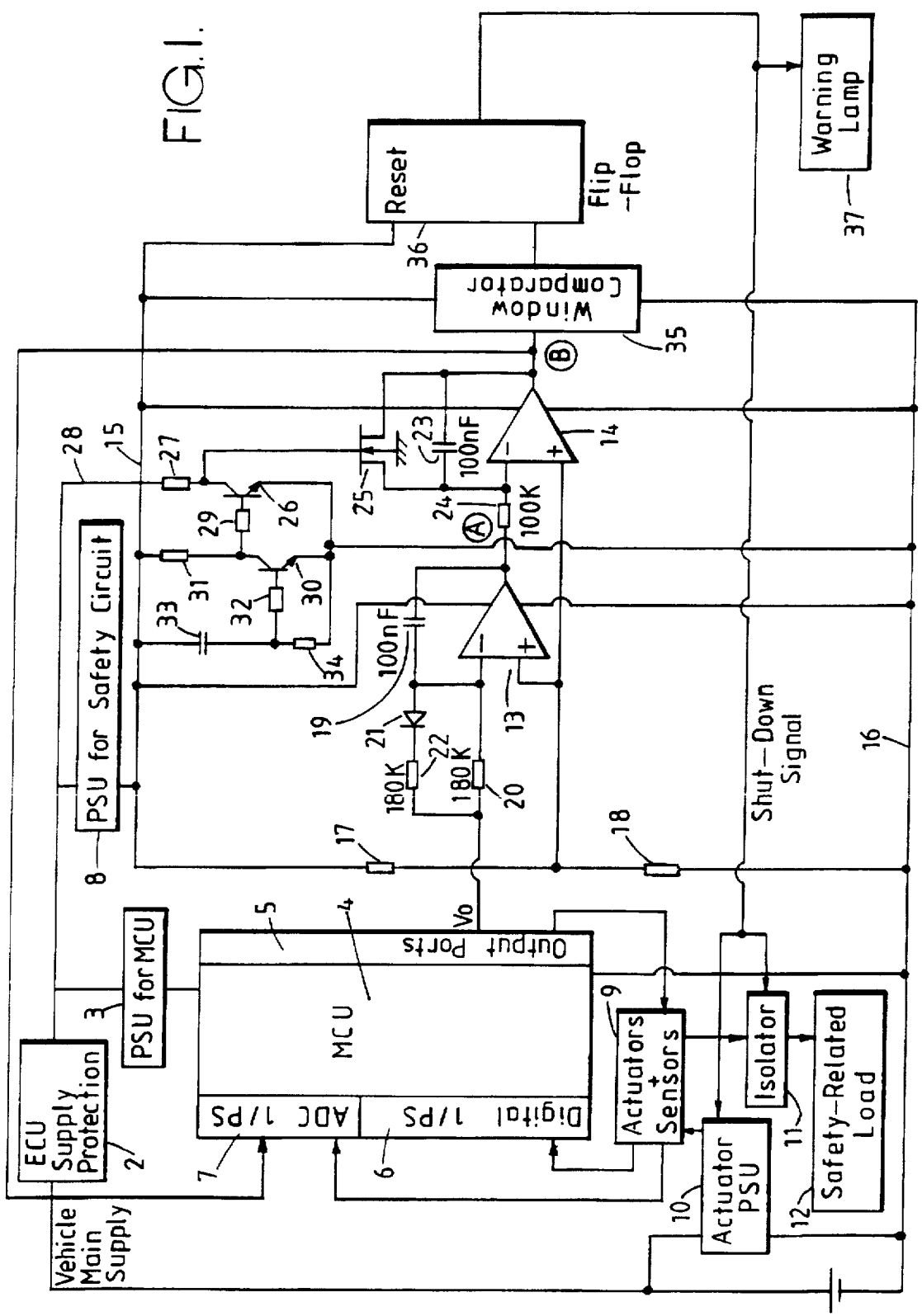
FIG. 1 is a partly schematic circuit diagram of a control system constituting a first embodiment of the present invention.

FIG. 1 shows part of an automotive control system for controlling power assistance to a vehicle steering system. A vehicle battery 1 is connected to an electronic control unit (ECU) supply protection circuit 2 which supplies power to a power supply unit (PSU) 3 for a microcontroller (MCU) 4 having output ports 5, digital inputs 6, and analog-to-digital (ADC) inputs 7. The MCU further comprises a microprocessor, read only memory containing operating software, volatile random access memory, and non-volatile random access memory, for retaining data when the system is unpowered. A separate safety circuit PSU 8 is provided for a safety circuit.

One of the output ports 5 is connected to steering actuators and sensors 9 having outputs connected to the inputs 6 and 7 of the MCU 4. For instance, the actuators may include an electric motor for providing power assistance to the vehicle steering and the sensors may include a sensor monitoring steering angle and a sensor monitoring the amount of assistance required. An actuator PSU 10 supplies power to the actuators 9. The actuator output is supplied via an electrically controlled isolator 11 to a safety-related load 12, such as the mechanical steering system of the vehicle.

Another of the output ports 5 of the MCU 4 is connected to the input of two integrators connected in cascade and based on operational amplifiers 13 and 14. The operational amplifiers 13 and 14 have power supply inputs connected between a power supply line 15 from the circuit 8 and a common supply line 16 so as to receive a filtered and regulated five volt supply. The operational amplifiers 13 and 14 have non-inverting inputs connected together and to the output of a potential divider comprising resistors 17 and 18 and arranged to provide a positive reference voltage of three volts with respect to the common supply line 16.

In addition to the operational amplifier 13, the first integrator comprises an integrating capacitor 19 having a value of 100 nF connected between the output and the inverting input of the operational amplifier 13. The inverting input is connected via a resistor 20, having a value of 180 kilohms, to the output port. The inverting input is further connected to the anode of a diode 21 whose cathode is connected via a further resistor 22 having a value of 180 kilohms to the output port.

In addition to the operational amplifier 14, the second integrator comprises an integrating capacitor 23 having a value of 100 nF connected between the output and inverting input of the operational amplifier 14. A resistor 24 having a value of 100 kilohms is connected between the inverting input of the amplifier 14 and the output of the amplifier 13. The source/drain channel of a field effect transistor 25 is connected in parallel with the capacitor 23. The gate of the field effect transistor 25 is connected to the collector of a common-emitter connected transistor 26, whose collector is further connected via a resistor 27 to a power supply line 28 from the protection circuit 2. The base of the transistor 26 is connected via a resistor 29 to the collector of a common-emitter connected transistor 30 whose collector is connected via a resistor 31 to the supply line 15. The base of the transistor 30 is connected via a resistor 32 to first terminals of a capacitor 33 and a resistor 34. The second terminal of the capacitor 33 is connected to the supply line 15. The second terminal of the resistor 34 and the emitters of the transistors 26 and 30 are connected to the common supply line 16.

The output of the operational amplifier 14 is connected to one of the ADC inputs 7 of the MCU 4 and to the input of a window comparator 35 whose output is connected to the set input of a latch 36. The latch 36 may be reset by a connection with the supply line 15. The output of the latch 36 is connected to a warning lamp 37 and to inputs of the actuator PSU 10 and the isolator 11 so as to supply a shut down signal thereto.

When power is applied to the control system, the capacitor 33 is initially discharged and holds the base of the transistor 30 at the voltage of the supply line 15. The transistor 30 is switched on and its collector holds the base of the transistor 26 at the common supply line voltage. The transistor 26 is therefore switched off and the transistor 25 is switched on so as to short-circuit the capacitor 23 and hold the second integrator reset. The capacitor 33 is charged via the resistor 34 with a time constant such that the remainder of the control circuit has settled down and the MCU 4 has completed its initialisation mode of operation before the falling voltage at the base of the transistor 30 cuts it off. This causes the transistor 26 to be turned on so as to remove drive to the field effect transistor 25. The transistor 25 is thus switched off so that the short circuit across the capacitor 23 is removed.

The connection of the latch 36 to the supply line 15 similarly ensures that the latch 36 is reset before the control system begins to operate.

During normal operation of the control system, the MCU 4 controls operation of the safety-related load 12 through the actuators and in response to signals from the sensors 9. In the absence of the shut down signal from the latch 36, the PSU 10 supplies power to the actuators and sensors 9 and the isolator 11 provides a functional connection between the actuators and the load 12.

During normal operation of the system, the MCU 4 supplies an output signal Vo to the input of the first integrator whose output controls the second integrator. The first and second integrators form an unstable circuit, as hereinbefore defined, whose output has an unstable equilibrium state. The output of the second integrator is supplied to the window comparator 35, which produces an output signal if the second integrator output falls outside the comparison window. In the event of the window comparator 35 producing an output, the latch 36 is set so as to illuminate the warning lamp 37 and supply a shut down signal to the PSU 10 and the isolator 11. The PSU 10 is thus disabled and the isolator 11 isolates the actuators from the load 12 so as to permit non-power assisted operation of the vehicle steering to continue. Power assistance is thus disabled until such time as the latch 36 is reset by removing and reapplying power to the circuit.

In addition to controlling power assistance of the vehicle steering system, the MCU 4 also performs a function which, during correct operation of the system, ensures that the output signal B of the second integrator remains within the window of the window comparator 35. The function performed by the MCU 4 to achieve this is illustrated schematically in FIG. 2. The function is performed digitally and repetitively by the MCU 4 on the sampled and converted output B(t) of the ADC within the MCU 4. The signal B(t) is subtracted at 40 from a target value Ta to form an error value E(t). This error signal is multiplied at 41 by a proportional constant P to form a proportional term P·E(t). The error E(t) is supplied directly and via a one cycle time delay 42 to a differencer 43 which forms a difference signal ΔE(t) as (E(t)−E(t−1)). The difference signal is multiplied at 44 by a differential constant D to form a differential term D·ΔE(t). The result of the function from the previous cycle is supplied via a one cycle delay 45 and is multiplied at 46 by a feedback constant F to give a feedback term F·Vo(t−1). The proportional, differential, and feedback terms are then summed at 47 to form a sum which is compared at 48 with a threshold. If the sum exceeds the threshold Th(t), then the output Vo(t) is set to logic level 1 at 49. Otherwise, the output is set to logic level 0.

Figure 2:
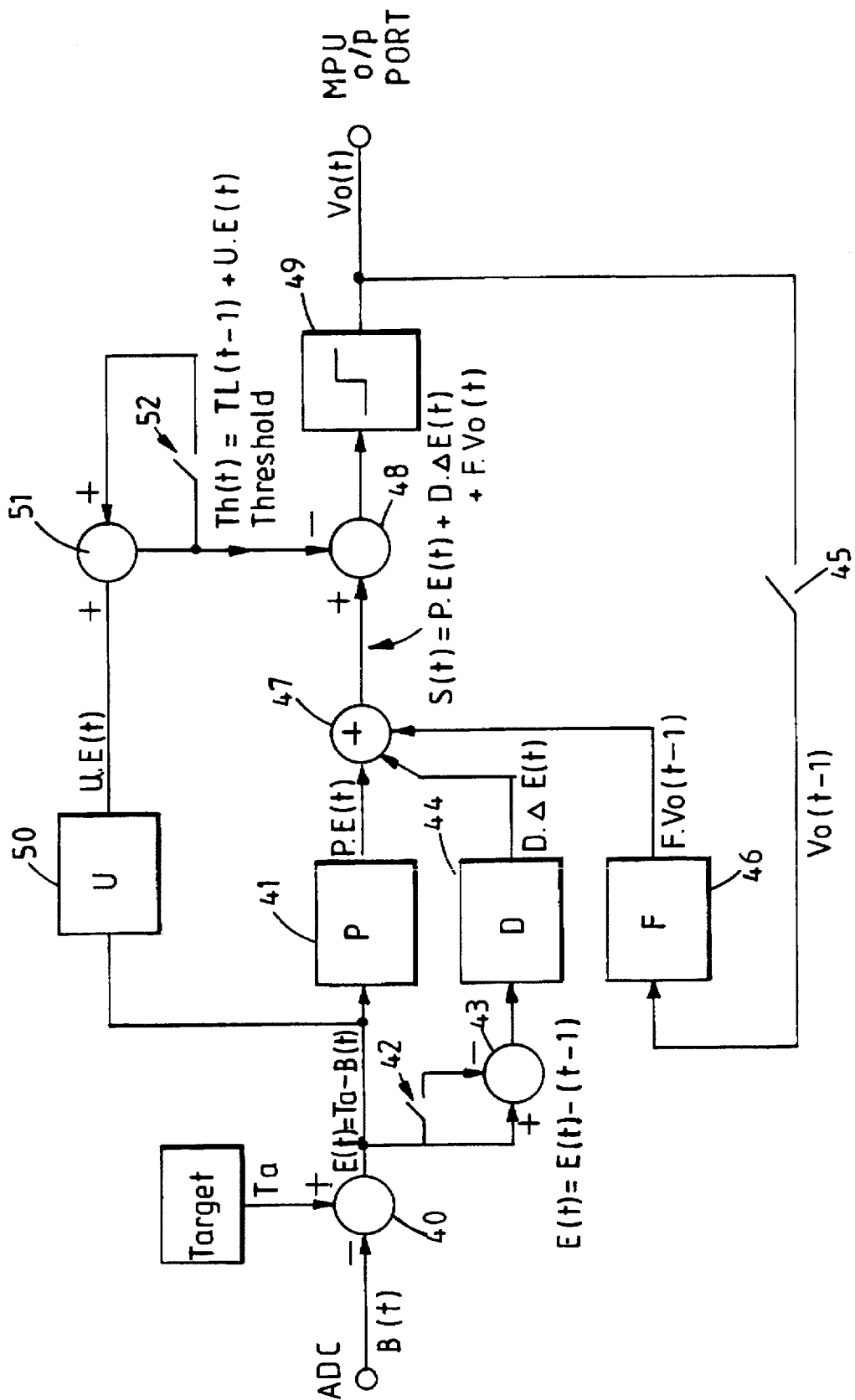
FIG. 2 is a schematic diagram of a function performed by an MCU of the control system of FIG. 1.

The threshold Th(t) may be a fixed threshold. However, in order to accommodate tolerances in other parts of the control system, an adaptive threshold may be used and this is illustrated in FIG. 2. The error E(t) is multiplied at 50 by an update rate U and is then added at 51 to the previous threshold Th(t−1) to form the current threshold value. Thus, the error E(t) is integrated with a time constant inversely related to U and added to the threshold. When the control system is depowered, the current threshold is stored in non-volatile memory for use when the system is repowered.

In a specific implementation of the control system illustrated in FIGS. 1 and 2, the target voltage Ta was set at 2.5 volts i.e. halfway between the supply lines 15 and 16, the three volt reference supplied to the non-inverting inputs of the operational amplifiers 13 and 14 thus being offset with respect thereto. The proportional gain P had a value of 0.8, the derivative gain D had a value of 3.1, the feedback gain F had a value of −320, and the update rate U had a value of 0.002. The target voltage Ta was represented as 512 bits. The control algorithm illustrated in FIG. 2 was performed every 4 milliseconds and the window thresholds of the comparator 35 were set to 1 volt and 4 volts. With the values previously specified, the second integrator has a gain of −100 per second. With the voltage Vo at the level of the common supply line 16, the first integrator has an effective input of −3 volts and a gain of −111 per second to give an output voltage A which rises at a rate of 333 volts per second. When the output voltage Vo is at a high level, the diode 21 is forward biased so that the integrator has a gain of −55.6 per second with an effective input voltage of +2 volts to give a ramp rate of −111 volts per second as its output A.

With the values specified hereinbefore, during normal operation of the MCU 4, the output B of the second integrator is constrained to lie between 1.8 and 3.2 volts. Thus, the output voltage of the second integrator remains within the window of the window comparator 35 and the control system functions normally.

In the event of a fault occurring in the MCU 4, for instance such that a fixed frequency for a repetitive pattern is produced at the output port in place of the signal Vo, a ramping output A is produced at the output of the first integrator. Only in the unlikely event of an exact match to the circuit conditions will the first integrator output remain stationary. Even more unlikely is an exact match between any such stationary output and the reference voltage of the second integrator. Thus, in practice, the output voltage B of the second integrator will quickly move outside the window of the comparator 35 so that the shut down signal is supplied via the latch 36 and the output signal B of the second integrator will be held within the window of the comparator 35 only when a fully functional closed loop control algorithm as shown in FIG. 2 is running correctly in the MCU. In the event of any failure occurring in the MCU, the output signal B will ramp beyond one of the window thresholds within a very few computational cycles, in many circumstances within only a single cycle, so that the load 12 is disengaged from the control system with an extremely rapid response time in the event of a fault or failure.

Figure 3:
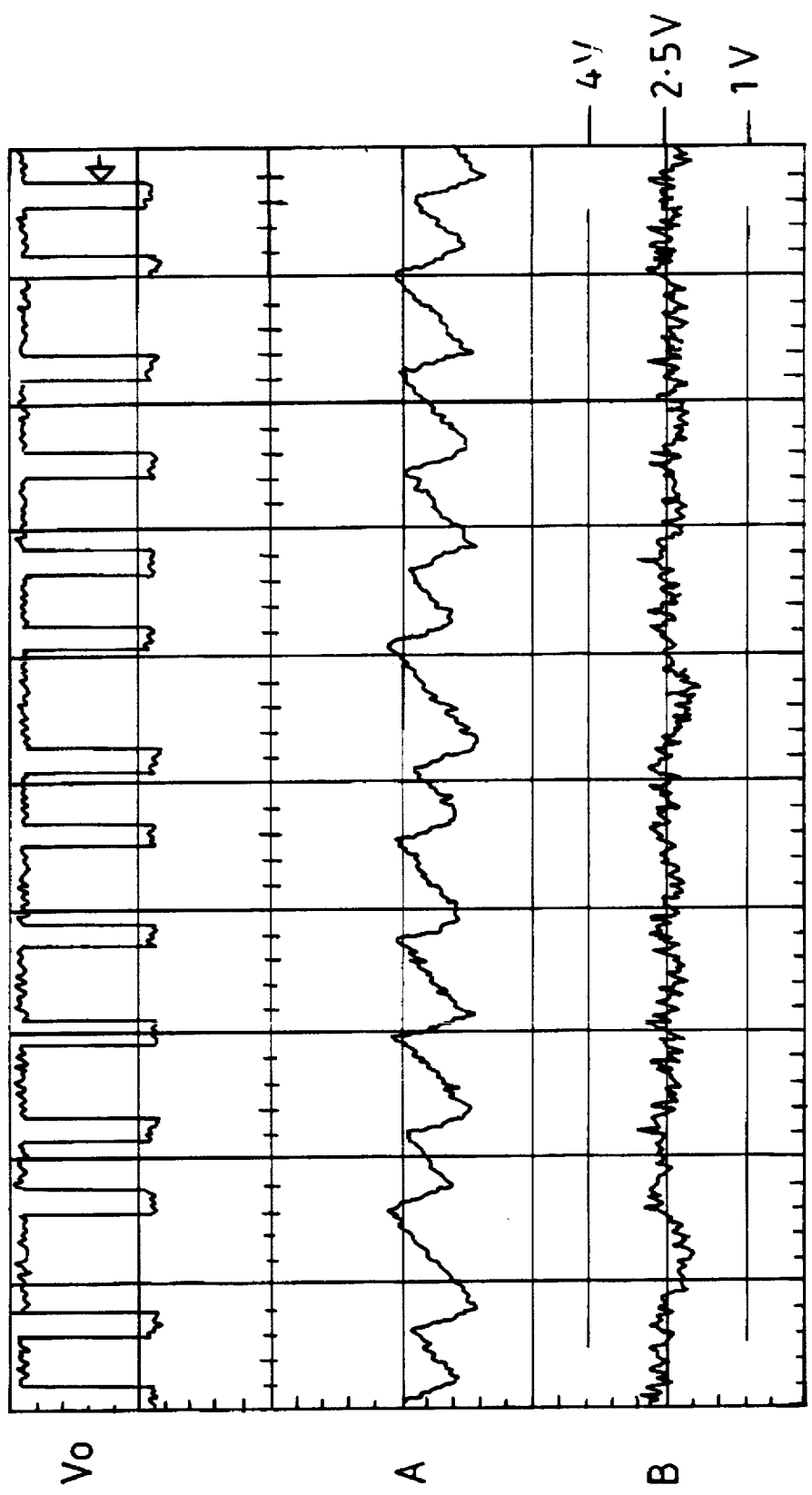
FIG. 3 is a timing diagram illustrating voltages against time at various points in the control system of FIG. 1.

FIG. 3 illustrates the output voltage Vo, the first integrator output signal A, and the second integrator output signal B during normal operation of the control system. The MCU 4 controls the cascade-connected integrators such that the output signal B remains well within the window thresholds of the comparator 35.

Various modifications may be made within the scope of the invention. For instance, in order to provide an even higher level of assurance that the window thresholds will be passed in the event of a fault in the MCU 4, a reliable wide band noise signal may be injected as an additional input into either of the integrators. The noise signal may come from any suitable random noise source, such as of the amplified diode type. Alternatively, a pseudo-random noise source could be used but, because this would be embodied in binary logic, it would be not so dissimilar from the technology of the MCU 4. If a noise signal were injected into the second integrator, then it would be possible to obtain quite a high assurance of fault detection with only the one integrator. In either case, failure of the noise source could be detected by the reduced level of control action necessary to maintain the output signal B of the second integrator within the comparator window. In this case, a warning could be issued and the control system shut down by diagnostic code running in the MCU 4 long before a second failure of the MCU might require the presence of noise to enhance its detection.

The safety circuit control task, embodied as the function illustrated in FIG. 2, is designed to run at a particular repetition rate (every 4 milliseconds in the specific example described above). If some application software malfunction were to occur that resulted in the safety circuit control task running at a significantly different rate, then the control task would be unable to control the safety circuit adequately and the output signal B of the second integrator would exceed one of the window thresholds. The system is thus protected/against the effects of software entering any erroneous mode of operation which would cause it to deviate significantly from its original timing specification. Further, the system is protected against the accidental use of an incorrect MCU timing crystal during system manufacture or severe drift of the crystal frequency in service.

A further level of protection against application software malfunction could be provided by distributing the software of the safety circuit control task throughout the various modules of the application software. Each iteration of the safety circuit control task would then depend on the execution of each of the modules of the application software in which it is distributed. This would provide protection against the effects of any failure of an individual software process which might leave other processes, including the safety circuit control task, operating correctly.

A further system verification can be performed by the safety circuit control task. Correct operation of the system may be made to depend on a critical event, such as an external interrupt, which, under normal circumstances, occurs at a rate equal to or faster than the repetition rate of the safety circuit control task. Execution of the safety circuit control task may then be made conditional on the event having been recognised. If the event does not occur, then execution of the safety circuit control task will be inhibited and shut down will be initiated. Such an arrangement ultimately verifies the timing of the external event by means of the safety circuit hardware.

The control system may be arranged such that, during depowering, the MCU 4 emulates its own failure in order to check that the safety circuit and shutdown signal path are operating correctly. The MCU 4 does this by ceasing to control the output Vo so that the signal B should violate the window thresholds. The MCU 4 monitors the effect of this emulated failure by measuring the output of the actuator PSU 10 as seen in the actuator and sensor block 9. If no shutdown is detected within a specified safe time, the MCU 4 issues a diagnostic code and shuts the control system down until a repair is effected.

A problem may occur when the self-checking is performed during depowering in that, if the system is immediately repowered, the self-checking may result in the latch 36 being set so that the actuator power supply 10 and the isolator 11 are disabled during subsequent operation. In order to avoid this problem, the control system of FIG. 1 may be modified as shown in FIG. 4.

Figure 4:
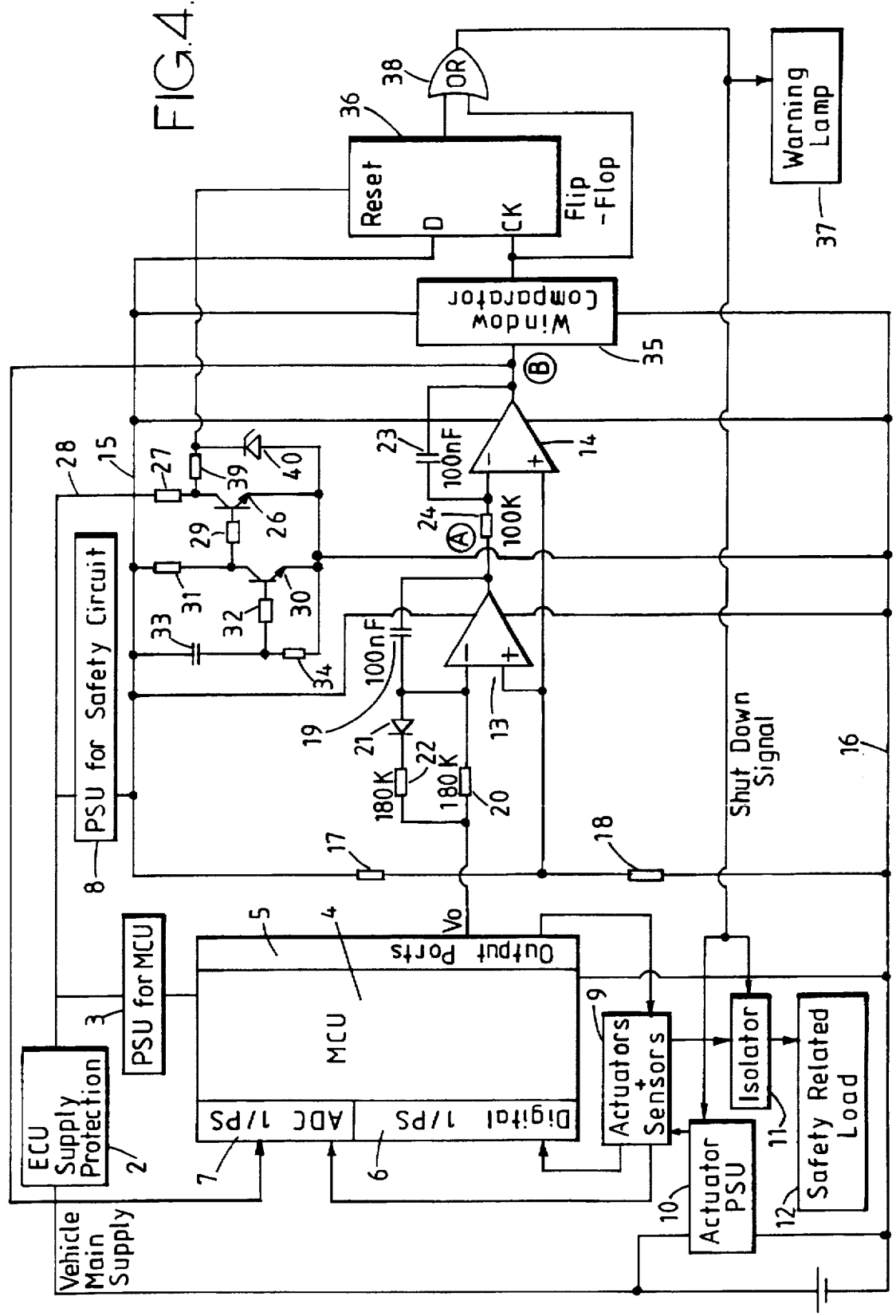
FIG. 4 is a partly schematic circuit diagram of a control system constituting a second embodiment of the invention. Like reference numerals refer to like parts in the drawings.

The control system shown in FIG. 4 differs from that shown in FIG. 1 in that the transistor 25 is omitted, the latch 36 is a D type latch, an OR gate 38 is provided with its output controlling the actuator power supply unit 10 and the isolator 11 and its inputs connected to the output of the latch 36 and to the output of the comparator 35, and the collector of the transistor 26 is connected via a resistor 39 to an asynchronous reset input of the latch 36 and via a zener diode 40 to the common supply line 16. The output of the window comparator 35 is connected to a clock input of the latch 36, which is of the type which transfers data from the D input to the output on the positive going transition of the clock input. The D input of the latch is connected to the supply line 15.

When the control system of FIG. 4 is powered up, the delay circuit comprising the components 26, 27, and 29 to 34 disables the latch 36 for a predetermined time period. The resistor 39 and the zener diode 40 limit the voltage applied to the asynchronous reset input of the latch 36 so as to prevent damage to the latch.

The output of the OR gate 38 follows the output of the window comparator 35 during the predetermined period when the delay circuit output is high. Afterwards, any high signal at the clock input is captured at the output of the D type latch 36 and hence at the output of the OR gate 38 until the power supply is removed.

The MCU 4 may emulate its own failure as described hereinbefore. However, the arrangement shown in FIG. 4 allows the MCU to regain control of the voltage B before the latch 36 is armed to latch any excursion of the voltage B outside the window thresholds of the comparator 35.

The arrangement of FIG. 4 also allows for the MCU to perform a test of the safety circuit function during a predetermined initial time period at power up, if required. To do this, the MCU controls the voltage B so as to satisfy the window comparator thresholds, ceases controlling the voltage B, observes the shutdown as before, and then regains control of the voltage B before the end of the predetermined period. In this case the predetermined period may need to be appropriately extended. An advantage of a power-up test is that it allows for early detection of faults that have only manifested themselves during the preceding nonoperational period.

It is thus possible to provide a control system having an integral safety function which provides for highly reliable detection of failures and ensures shutting down of a safety-related load should a failure occur. The safety circuit is inexpensive and simple to implement and the additional software required by the MCU to perform this function imposes no substantial cost penalty or complexity penalty.

We claim:

1. A control system comprising:
   a controller having an input, a first output forming a system control output, and a second output;
   an unstable circuit having an input connected to said second output and an output connected to said input of said controller, said unstable circuit providing an output voltage which is equal to a substantially constant equilibrium output voltage when an input voltage is equal to a predetermined constant steady state input voltage and which changes so that three parameters
   (1) a difference between said output voltage and said equilibrium output voltage
   (2) a first time differential of said parameter (1)
   (3) a second time differential of said parameter (1)
   never simultaneously asymptotically approach zero after said input voltage is momentarily changed from and returned to said steady state input voltage; and
   a detector connected to said output of said unstable circuit for signalling an error when said output voltage of said unstable circuit is outside an acceptable range, wherein said controller, during correct operation thereof, supplies at said second output a signal which causes said unstable circuit to produce said output voltage within said acceptable range.

2. A system as claimed in claim 1, in which said unstable circuit comprises a first integrator and a second integrator connected in cascade.

3. A system as claimed in claim 2, in which each of said first and second integrators receives a reference voltage which is asymmetric with respect to integrator supply voltages.

4. A system as claimed in claim 2, in which said first integrator has a first time constant for a first input voltage range and a second time constant different from said first time constant for a second input voltage range different from said first input voltage range.

5. A system as claimed in claim 1, in which said detector comprises a window comparator.

6. A system as claimed in claim 1, in which said controller comprises a digital controller.

7. A system as claimed in claim 1, in which said unstable circuit comprises an analog circuit.

8. A system as claimed in claim 1, further comprising a first power supply for said controller and a second power supply for said unstable circuit.

9. A system as claimed in claim 1, further comprising a latch connected to an output of said detector.

10. A system as claimed in claim 1, in which said controller supplies at said second output a two state signal comprising pulses having one of a duty cycle and a density which varies so as to cause said output voltage of said unstable circuit to remain within said acceptable range during correct operation of said controller.

11. A system as claimed in claim 1, further comprising means for disabling control by said first output in response to said error signalled by said detector.

12. A system as claimed in claim 1, in which said controller is arranged to perform a diagnostic test of said unstable circuit.

13. A system as claimed in claim 12, in which, during said diagnostic test, said controller alters said signal at said second output so that said unstable circuit produces a signal outside said acceptable range and said controller monitors said detector for said signalling of said error.

14. A system as claimed in claim 13, in which said controller disables said second output when said detector fails to signal said error during said diagnostic test.

15. A system as claimed in claim 13, further comprising a first timer for supplying a time signal during a time period beginning with an application of power to said system and a disabling circuit for disabling said unstable circuit during said time period.

16. A system as claimed in claim 12, in which said controller performs said diagnostic test during an application of power to said system.

17. A system as claimed in claim 12, in which said controller performs said diagnostic test during a removal of power from said system.

18. A system as claimed in claim 13, in which, during said diagnostic test and subsequent to said signalling of said error by said detector, said controller restores said signal at said second output so that said unstable circuit produces said output signal within said acceptable range to define an end of said diagnostic test, said system further comprising a second timer for preventing latching of said signalling of said error by said detector during said diagnostic test.

* * * * *